(12) United States Patent
Boivie

(10) Patent No.: US 6,415,312 B1
(45) Date of Patent: Jul. 2, 2002

(54) RELIABLE MULTICAST FOR SMALL GROUPS

(75) Inventor: Richard H. Boivie, Monroe, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,546

(22) Filed: Jan. 29, 1999

(51) Int. Cl.[7] .............................................. G06F 15/15
(52) U.S. Cl. ...................... 709/200; 709/201; 709/213; 709/232; 709/238; 370/351; 370/355; 370/400; 714/748
(58) Field of Search ................................ 709/200–204, 709/212–214, 227–228, 232–233, 236–238; 370/400–401, 408–409, 259–260, 351, 355–356; 714/746–750

(56) References Cited

U.S. PATENT DOCUMENTS

| | | | | |
|---|---|---|---|---|
| 5,541,927 A | * | 7/1996 | Kristol et al. ................ 370/408 |
| 5,621,734 A | * | 4/1997 | Mann et al. ................. 709/227 |
| 5,627,970 A | * | 5/1997 | Keshav ....................... 709/233 |
| 5,862,329 A | * | 1/1999 | Aras et al. ................... 709/204 |
| 5,959,995 A | * | 9/1999 | Wicki et al. ................. 370/400 |
| 6,018,766 A | * | 1/2000 | Samuel et al. ............... 709/218 |
| 6,049,546 A | * | 4/2000 | Ramakrishnan ............. 370/412 |
| 6,198,735 B1 | * | 3/2001 | Pazhyannur et al. ........ 370/349 |

* cited by examiner

*Primary Examiner*—Bharat Barot
(74) *Attorney, Agent, or Firm*—Fleit, Kain, Gibbons, Gutman & Bongini P.L.; Michael J. Buchanhorner; Casey P. August

(57) ABSTRACT

A system for reliable multicast transmission [multicasting data packets] in a packet-based data network includes mechanisms for performing the following: (1) preparing at least one packet comprising a payload portion and multicast route information, an error detection mechanism; (2) transmitting the packet to at least one intermediate node for delivery to at least two destination nodes; (3) waiting for a period of time for at least one acknowledgment signal indicating receipt of the at least one packet by at least one destination node; and (4) retransmitting a packet to a set of destination nodes from which no positive acknowledgment has been received. The multicast routing information includes information for use by the at least one intermediate node to forward the packet to at least two destination nodes.

20 Claims, 2 Drawing Sheets

RELIABLE MULTICAST FOR SMALL GROUPS

CROSS-REFERENCE TO RELATED APPLICATIONS

This application is being filed concurrently with application Ser. No. 09/240,549, titled Multicast Support For Small Groups, both assigned to International Business Machines Corporation.

BACKGROUND OF THE INVENTION

1. Field of the Invention

The invention disclosed broadly relates to the field of computer networks, and more particularly relates to the field of multicasting under various protocols including the Internet protocol (IP).

2. Description of the Related Art

The Internet has provided the public worldwide network required for the global linking of various networks and application of personal computers. In this regard, the Internet Protocol ("IP") has become an important moving force for the growth of computer applicability. The Internet is a packet-based communication system. Each packet comprises a header portion that includes routing information and a payload (or message) portion that includes the data to be delivered. The header portion includes a destination node, a source node, and a portion identifying the protocol as the IP. IP packets can be transmitted as unicasts or multicasts. A unicast is a point-to-point transmission wherein the header identifies one source and one destination. A multicast identifies various destinations. In the case of a multicast, the destination address in the IP header corresponds to a group of several destination nodes. Thus, a multicast would be initiated by a source node sending an IP packet to a "group" address such that it reaches all the nodes in the group. There are various multicast algorithms in common use today. Thus, the IP protocol has many applications such as electronic-mail and IP telephony. Of these applications, IP multicast will be increasingly important in the future, and it will become more useful to support large numbers of "small" multicast groups. This will be driven by several developments—such as IP Telephony and the emergence of small, mobile computing devices that are capable of supporting real-time voice and data communications. As IP telephony becomes widely adopted, it will become very important to support large numbers of conference calls with a small number of parties (such as 5 or less). It seems reasonable to expect that there will be a similar need to support many similarly small voice-data conferences and voice-data-video conferences. Multicasting offers one solution to the problem of providing efficient communications within groups.

Some of today's IP multicast schemes, such as the "dense mode" schemes, are suitable for the case in which there are a small number of large multicast groups that are of interest all over the Internet. These work well if one is trying to distribute "broadcast channels" like ABC, NBC, CBS, BBC, CNN and ESPN to viewers all around the world but they have scalability problems when there is a large number of groups. The nodes in the IP network build a distribution tree for each source and multicast group pair and they disseminate this multicast routing information to places where it is not needed—which is not desirable due to increased congestion.

In other schemes such as CBT (Core Based Trees) there has been an attempt to limit the amount of multicast routing information that needs to be disseminated, processed, and stored throughout the network. These schemes use a "shared distribution tree" that is shared by all the members of a multicast group and they try to limit the distribution of multicast routing information so that this information only goes to the nodes that "really need it." But these schemes also have problems. These problems include: (1) the tendency to concentrate traffic on small portions of a network and use of less than optimal paths in routing packets to their destinations, and (2) the requirement that each of the routers on a multicast tree "signal" and store the multicast routing information, which can be a problem if there are a large number of multicast groups.

In many applications, the need for multicasting timeliness of packet delivery is more important than reliability. However, in other applications reliable transmissions are highly desirable.

Accordingly, there is a need for a system which overcomes the above problems.

SUMMARY OF THE INVENTION

The multicasting system described herein provides a solution for the problems discussed above.

Therefore, in accordance with the invention, in a multicast system, a method for multicasting data packets in a packet-based data network comprises the source node steps of: preparing at least one packet comprising a payload portion, multicast route information, and an error detection mechanism; transmitting the packet to at least one intermediate for delivery to at two destination nodes; waiting for at least one acknowledgment signal indicating receipt of the at least one packet by at least one receiving node; and retransmitting a packet to a set of receiving nodes from which no acknowledgment has been received. The multicast route information includes information for use by the at least one intermediate node to forward the packet to at least two destination nodes. The waiting period can be a fixed period or adjustable based on measured return times. Of course, when re-transmitting data not received, the re-transmitted data need not be packaged or routed the same way as in the original transmission.

DETAILED DESCRIPTION OF AN EMBODIMENT

Figure 1:
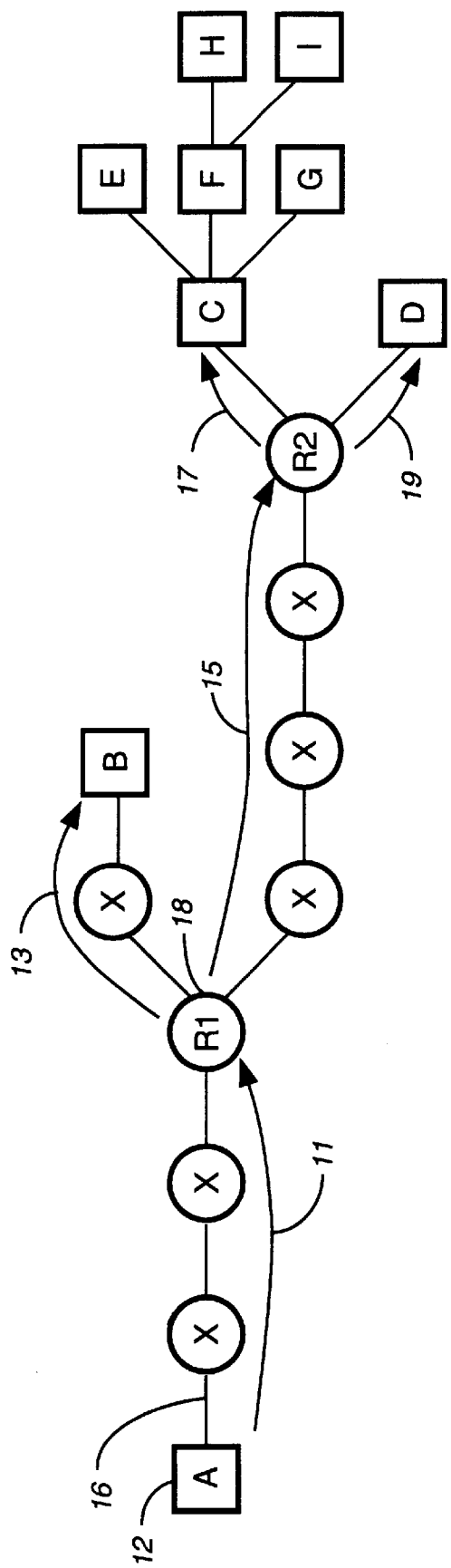
FIG. 1 is an illustration of a portion of an IP network according to the present invention.

Referring to FIG. 1 there is shown a portion of a data network 10 representing an embodiment of the invention. The network 10 includes a plurality of nodes each comprising end-stations which can be large host computers or user stations like personal computers or telephone handsets, and intermediate nodes which can be routers switches. The network 10 further comprises a series of routers 18 located at point in the network where there is a fork in the multicast transmission tree (represented by nodes R1 and R2). The nodes in the network 10 are coupled by means of a plurality (two or more) links 16.

The network 10 can be operated under the IP but the principles of the invention also apply to other protocols such as Appletalk, Novell IPX or successors to any of those protocols. When the user of the source node A wishes to send a multicast packet, the data processing system at source node A prepares a packet (or set of packets) that includes information that intermediate nodes can use to deliver the packet to the desired destinations. In the example shown, source node A can send a multicast transmission to destination nodes B, C and D by sending a transmission (including a packet or set of packets) 11 to an intermediate node R1 that includes appropriate instructions so that: (1) node R1 can forward an appropriate packet 13 to node B; and (2) node R1 can forward an appropriate packet 15 to R2 that node R2, in turn, can use to forward appropriate packets 17 & 19 on to nodes C and D respectively.

The packet 11 that node A sends to node R1 may look like this:

IP header: dest=R1, src=A, protocol=encapsulated multicast (i.e. a new protocol type)

IP payload: contains an encapsulated multicast datagram

Where the encapsulated multicast (EM) datagram might look like this:

EM header:
one byte indicating the header length and a variable number of bytes of "multicast routing information". The EM header can be defined in a number of ways. One possibility can include a version number, a header length, a header checksum and then the actual. multicast routing information.

EM payload: the payload that A is trying to get delivered to B, C, and D

The multicast routing information may look like:

B R2(CD)

This multicast routing example means that node R1 should send one packet to node B and one packet to R2 and that the packet to node R2 should include instructions that node R2 can use to get the packet to nodes C and D.

The multicast routing information recursively nests to an arbitrary depth so if node C were a router that was supposed to forward packets to nodes E, F, and G, the multicast routing information would look like this:

B R2(C(EFG)D)

If node F were a router that was supposed to forward packets to nodes H & I, the multicast routing information would look like this:

B R2(C(EF(HI)G)D)

A node can be both an intermediate and destination node. In the case of a node that is only a destination, the packet transmitted does not include instructions for a subsequent node to transmit to another node.

In one embodiment, the nodes in the list are 4-byte IPv4 unicast addresses, thus the left and right parentheses can be encoded in a single byte using values that are not used as the first byte of an IPv4 unicast address. In other words, a left parenthesis might be a byte with a decimal value of 224, for example, and a right parenthesis might have a value of 225. Also there are various ways to indicate the length of the field comprising the multicast routing information. One way is to include a length field in the packet. Another way is to use a marker to indicate the end of the multicast routing information. If an 'end of routing information' byte were used, this byte could have a value of 226, for example.

Since the packet contains all the necessary routing information it is easy for the nodes in the network to perform the appropriate forwarding or routing. When node R1 receives a packet with routing information equal to:

B R2(C(EF(HI)G)D)

It forwards one copy of the multicast payload to node B and one copy to node R2. The copy sent to node R2 contains routing information equal to:

C(EF(HI)G)D

When node R2 receives this packet, it forwards one copy of the packet to C with routing information equal to:

EF(HI)G and one copy of the packet to D. Similarly, when node C receives the packet, it sends a copy to nodes E, F, and G and when node F receives a copy of the packet, it forwards a copy to nodes H and I.

A node can eliminate items in the multicast routing information when forwarding packets as suggested in the example above. Another alternative is to use a pointer that indicates at what point the routing is. The pointer could indicate to a node along the route that a certain byte (byte 11 for example) has been processed, providing an indication of the status of the routing. A third alternative is that the node can simply "find itself" in the multicast routing information and process the packet according to the instructions found at that point in said multicast routing information.

Of course, the data processing system at source node A, must figure out the multicast routing information for the multicast flow. This is straightforward. At the beginning of a multicast transmission, node A, determines the route to each of the destinations. It can do this with something like the IP record-route option (which is slightly broken in IPv4 since the number of hops that can be recorded in the IP header is small) or something like an IP traceroute. It would be better to determine the route for the multicast flow with a single packet per destination so it would be advantageous to fix the IP record-route option or add a similar capability that actually works.

Once node A has a route to each of the various destinations, it can "fold" those routes together into an appropriate multicast tree. This "folding" can be accomplished in two steps.

In step 1, the routes to the various destinations are sorted "alphabetically" so that routes that share a common prefix are grouped together. For example, if node A had the following routes to destinations B, C and D:

R1 R2 D
R1 B
R1 R2 C it would sort those routes to produce the following sorted listed.

R1 B
R1 R2 C
R1 R2 D.

(In an IPv4 network, the nodes in the routes would be 4-byte integers rather than letters, but the basic concept remains the same.)

In step 2, node A "factors" out the common parts of adjacent list elements to produce a single route corresponding to a multicast distribution. In the above example, the last two routes can be combined to produce the following list:

R1 B
R1 R2(CD)

and then the remaining two routes can be combined to produce a list with a single element.

R1(BR2(CD))

Once node A has built the multicast distribution tree, it can begin sending multicast packets. When routes change, the source node A must adjust its multicast tree. This can be accomplished as follows.

Node A can send a unicast record-route packet periodically to each destination and adjust its multicast tree and its multicast routing information as appropriate.

The nodes (i.e., routers) in the middle of the network can also send an Internet Control Message Protocol ("ICMP")

message if/when they detect that node A needs a new multicast tree. If a router, R, on the tree does not have a route to one of the places that it is supposed to send packets to, node R should inform node A of that via an ICMP error message. When node A gets this message, it can send out the record-route unicast packets and rebuild its tree.

A router, R, that is forwarding a multicast packet to one or more next hops can also send node A an appropriate ICMP message if the tree seems to be incorrect at R. The link on which router R receives a given packet and the links on which router R forwards that packet should all be distinct. If this is not the case, router R can conclude that routes have changed and that the current multicast tree is no longer appropriate. So router R should send an ICMP message to node A so that node A can rebuild the tree.

Also, in many cases a higher level entity in the protocol stack, such as the Real-Time Transport Protocol ("RTP")/RTP Control Protocol (RTCP) will monitor the quality of the "connection." In this case, the higher level entity in node A can inform the lower levels when connection quality deteriorates so that the lower levels in node A can rebuild the multicast tree. This is something like what Berkeley Unix based Transmission Control Protocol ("TCP") implementations do. When TCP detects a problem with a connection, it tells the IP so that IP can throw away any route for the connection that it may have cached.

If the routers and the higher level entities in node A inform node A's multicasting layer of problems as described above, the periodic transmission of the unicast packets does not need to be very frequent. If node A sends a unicast packet to each of five destinations every two seconds that is a relatively small amount of overhead on a voice conference call in which node A may be sending on the order of 60 multicast voice sample packets per second. Of course if data and/or video is added to the voice conference, the amount of overhead as a percentage of the total packets transmitted decreases. Another possibility is to eliminate periodic retransmission entirely because the other mechanisms may be sufficient to re-create the tree.

One other advantage of this scheme is that it can work in the presence of "legacy" routers; that is, routers that are not programmed for the encapsulated multicast scheme. Even if some router between nodes A and R1 in FIG. 1 is not programmed for encapsulated multicast, the scheme works well. If node R1 is not programmed to handle an encapsulated multicast packet, the routing can still work to a certain extent. Node R1 will send an ICMP error back to node A and node A will know that it cannot count on R1 to perform the replicate-and-forward so node A can send 2 packets, 1 to node B and 1 packet to node R2. Node A can also handle the case if node R2 or another downstream fork in the tree cannot handle encapsulated multicast. The system will not work quite as well if many routers cannot handle encapsulated multicast but things will work. This backward compatibility with legacy routers is important since one cannot expect to upgrade all the routers in a large network such as the Internet or a large enterprise network instantaneously.

One disadvantage of this scheme is that the multicast packets need to include the multicast routing information, but this may not be a serious problem. Voice sample packets are typically fairly short, on the order of 20 bytes of data, so there is plenty of room in an Ethernet packet to include the multicast routing information and the rest of the Encapsulated Multicast ("EM") header, for example. If longer packets need to be distributed this could be an issue, though the EM header is fairly small for small multicast groups.

In summary, the system has the following advantages as will be apparent to those skilled in the art:

(1) The Present Invention can handle a large number of small groups.

(2) The effort involved to support these multicast groups is distributed to the nodes that actually need to know about these groups. If a node does not need to know about a multicast group, it does not have to do any work.

(3) The routers do not have to run a multicast routing protocol for these multicast groups. They do not have to send, receive, or process any multicast routing protocol messages and the routers do not have to store any per flow state for each of the potentially large number of multicast flows that may be present in the network.

(4) Traffic follows the correct paths as determined by the unicast routing protocols and the traffic is not concentrated in a small portion of the network. Network efficiency and latency is optimized.

(5) There is no need to talk to a single, centralized entity to acquire a unique multicast address when you set up a multipoint conference, which is important since such an entity can be a bottleneck and a point of failure.

(6) A majority of the forwarding that takes place in one of these multicast trees is conventional unicast forwarding, a highly optimized path in modern routers which runs very fast. The slower multicast forwarding only occurs at the "forks" in the tree, which also increases the performance and scalability of this scheme.

The multicast scheme discussed above provides for an "unreliable" multicast. That is, there's no provision for dealing with packets that are lost due to network congestion or because they were garbled during transmission due to line-noise, for example. This kind of "unreliable" transmission is useful in many applications in which the "timeliness" of packet delivery is more important than getting an "old" packet that was lost re-transmitted. IP telephony and video conferencing are applications in which the timeliness of packet delivery is more important than retransmitting an old packet that got lost. In other applications, like file transfer and electronic mail, reliability is more important than timeliness. A reliable multicast scheme would also be very useful. For example, in a video-conferencing application, a reliable multicast could be used to reliably & efficiently transmit a foil presentation or the contents of a whiteboard, say, to multiple conference participants. Since it's important that the foil presentation or the whiteboard contents be transmitted correctly, and since timeliness is somewhat less important (i.e., it makes sense to re-transmit a lost packet even if the retransmitted packet is going to be 50 or 100 msec "late"), a reliable multicast scheme, involving re-transmissions, appears to be useful.

A reliable multicast scheme can be built by extending the multicast scheme for small groups as discussed above. This scheme includes all the advantages discussed above and it provides reliable multicast transmission. The scheme would work as follows. The EM header would include a sequence number and a checksum similar to TCP, which would be used to keep track of the bytes that have been sent and the bytes that have been successively received by each of the destination nodes. Each of the destinations would send acknowledgment signals (e.g, packets), or ACKs, to inform the sender of the bytes that they have received successfully and error-free. Two types of acknowledgments may be used: positive ACKs indicating an error-free detection at the receiving node and negative ACKs indicating that an error was detected in the received packet or packets. The checksum could be used to determine if a packet has been received error-free. Other error detection or reliability mechanisms can be used (e.g, a cyclic redundancy check).

As in TCP, the ACK includes a sequence number to indicate the last byte that has been successfully received. The sequence number could be that of the last byte successfully received or the first byte that has not yet been successfully received.

Also as in TCP, the sender could conclude that a receiver has not successfully received a packet when it does not receive an appropriate ACK within a certain period of time. As in TCP, the sender retransmits a packet that has not been successfully received. But unlike TCP, which re-transmits a packet to a single receiver, the reliable multicast scheme may need to retransmit a packet to more than one receiver.

When the sender needs to retransmit a packet, it uses a multicast tree for the retransmission. Since the sender knows the receivers that it needs to resend to and since it knows the (unicast) route to each of these receivers (as described above), it can build a multicast distribution tree and appropriate multicast routing information for the subset of receivers that it needs to re-send to.

Thus the retransmissions are optimized. Bandwidth is not wasted retransmitting information to nodes that have already successfully received that information. (If the sender needs to retransmit a packet to a singe receiver, the "multicast distribution tree" will, of course, be a "tree" with a single leaf.)(a receiving node can be an ultimate destination node or an intermediate node).

The waiting period for re-transmission can be adjusted such that unnecessary delays are not introduced into the system. The waiting period can also be adjusted to the longest return time. It is also possible to use a cumulative acknowledgment scheme (as in TCP) wherein the source node could use the notion of a transmission window to send a stream of packets without waiting for an acknowledgment of each one.

As in the multicasting scheme above, most of the work involved is done by the end-stations that are participating in the multicast group and the network doesn't need to store any state information or run any multicast routing protocols and there is no need for the network operator to negotiate or administer any multicast routing "peering agreements." The reliability scheme discussed herein can be implemented in the EM protocol described above or by encapsulating a reliability packet inside the EM payload.

Figure 2:
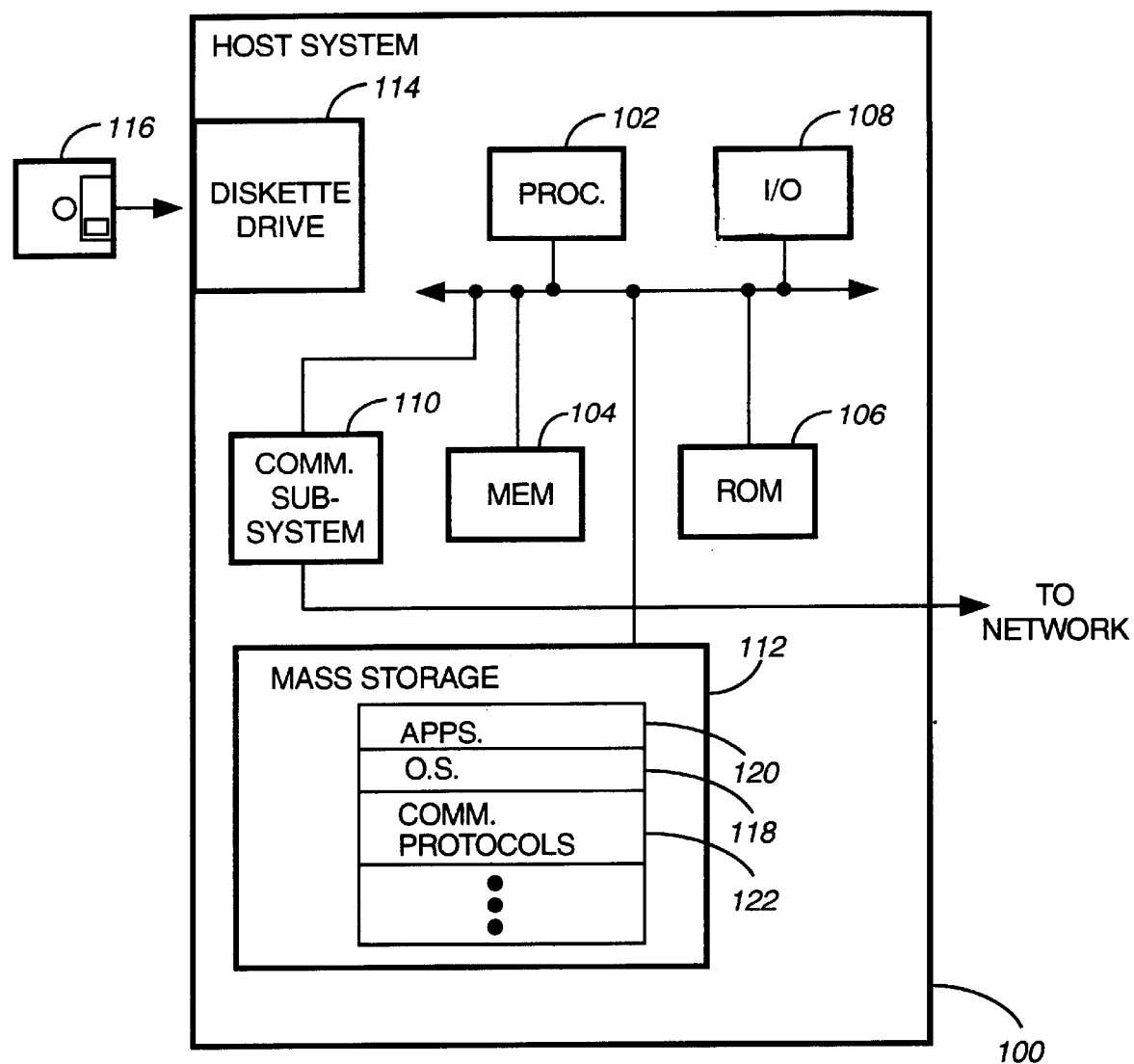
FIG. 2 is an illustration of a host IP processing unit for use according to the present invention.

Referring to FIG. 2, there is shown a simplified block diagram of a host system 100. The host system 100 could be used in any of the nodes shown in FIG. 1. The host system 100 comprises a processor 102, a memory 104, a ROM (read-only memory) 106, an I/O subsystem 108, a communication subsystem 110, and mass storage 112. The I/O subsystem 108 may comprise a keyboard, display screen, pointing device or other interfaces with a user be they direct or indirect. The communication subsystem 110 can be implemented in a variety of ways including a modem or a communications card according to any of several known protocols such as Ethernet or Token Ring. The connections shown herein are vastly simplified for illustration purposes. The mass storage subsystem may be implemented as a hard disk drive and associated controller. The system 100 is equipped with a diskette drive 114 adapted to receive diskettes 116 but could also include a CD ROM drive or any other suitable drive for removable information storage media. As is typical with systems such as this, the mass storage includes an operating system 120, a plurality of applications programs 118 and communication protocols 122. Thus in accordance with one embodiment of the invention, the general purpose computing apparatus can be programmed via a set of diskettes, CD ROM or over a network to operate in accordance with the protocol set forth herein. Alternatively, special purpose apparatus can be designed to implement the functionality of the invention. Any of the nodes shown in FIG. 1 can be programmed or otherwise adapted to operate in accordance with the invention.

Each node unit 100 can receive data packets under various protocols via the communication subsystem 110. The system 100 can also be used to package payloads (data) to create packets under a programmed protocol and to transmit such packets via subsystem 110 under the control of processor 102.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for reliable multicast transmission in a packet-based data network comprising the source node steps of:

preparing at least one packet comprising a payload portion, multicast route information, and an error detection mechanism;

transmitting the packet from a source node to at least one intermediate node for delivery to at least two destination nodes;

waiting for a period of time for at least one acknowledgment signal indicating receipt of the at least one packet by at least one receiving node; and retransmitting a duplicate packet from the source node to a set of destination nodes from which no positive acknowledgment has been received;

wherein the multicast routing information specifies the routing by which the packet is to be transmitted from the source node to the at least two destination nodes and wherein the multicast routing information specifies the least one intermediate node and the at least two destination nodes that are to receive the packet.

2. The method of claim 1 wherein the duplicate packet comprises:

a multicast distribution tree that specifies a subset of destinations that are to receive the duplicate packet and wherein the multicast distribution tree specifies the routing by which the duplicate packet is to be communicated.

3. The method of claim 2 wherein the step of retransmitting further comprises the step of:

adjusting the multicast routing tree responsive to receipt of acknowledgment signals.

4. The method of claim 1 wherein the retransmitting step comprises the step of retransmitting the packet when no positive acknowledgment signal has been received within a retransmission period of time.

5. The method of claim 1 wherein the retransmitting step comprises the step of retransmitting the packet when a negative acknowledgment signal has been received.

6. The method of claim 5 wherein the retransmission occurs immediately upon receipt of the negative acknowledgment signal.

7. The method of claim 5 wherein the retransmission occurs within a predetermined period upon receipt of the negative acknowledgment signal.

8. The method of claim 4 further comprising the receiving node steps of:

adapting the retransmission period of time to a period greater than the time elapsed from transmission of a packet to the time of receipt of at least one corresponding acknowledgment signal.

9. The method of claim 4 further comprising the steps of:

determining the response time for at least one acknowledgment signal;

adapting the retransmission period of time responsive to said determination.

10. The method of claim 1 wherein the step of preparing at least one packet further comprises the step of including a sequence number.

11. The method of claim 1 wherein the error determination mechanism comprises a checksum determination.

12. The method of claim 1 wherein the error determination mechanism comprises a cyclic redundancy check determination.

13. The method of claim 1 wherein the error determination mechanism comprises a parity bit determination.

14. The method of claim 1 further comprising the steps of:

destination acknowledgment signals from a subset of the destination nodes; and retransmitting to all the destination nodes.

15. The method of claim 1 further comprising the steps of:

destination acknowledgment signals from a subset of the destination nodes; and re-transmitting only to a subset of the destination nodes that did not receive the packet.

16. The method of claim 15 where in the step of waiting a period of time or until an acknowledgment ha s been received from each of the destination nodes.

17. The method for multicasting data packets in a packet-based data network of claim 10, further comprising the destination node steps of:

receiving at least one packet sent by the source node;

processing the sequence number and an error detection mechanism; and transmitting an acknowledgment signal indicating receipt of the at least one packet when the processing step indicates no error.

18. A computer readable medium comprising instructions for:

preparing at least one packet comprising a payload portion and multicast routing information;

transmitting the packet from a source node to at least one intermediate node for delivery to at least two destination nodes;

waiting for a period of time for at least one acknowledgment signal indicating receipt of the at least one packet by at least one destination node; and retransmitting a duplicate packet from the source node to a set of destination nodes from which no positive acknowledgment has been received;

wherein the multicast routing information specifics the routing by which the packet is to be transmitted from the source node to the at least two destination nodes and wherein the multicast routing information specifies the at least one intermediate node and the at least two destination nodes that are to receive the packet.

19. The computer readable medium of claim 18 wherein the computer readable medium comprises at least one data packet for transmission in a data network.

20. A system for reliable multicast transmission in a packet-based data network comprising:

means for preparing at least one packet comprising a payload portion, multicast route information and an error detection mechanism;

means for transmitting the packet from a source node to at least one intermediate node for delivery to at least two destination nodes;

means for waiting for at least one acknowledgment signal indicating receipt of the at least one packet by at least one destination node; and means for retransmitting a duplicate packet from a source node to a set of destination nodes from which no positive acknowledgement has been received;

wherein the multicast routing information specifies the routing by which the packet is to be transmitted from the source node to the at least two destination nodes and wherein the multicast routing information specifies the at least on intermediate node and the at least two destination nodes that are to receive the packet.

* * * * *

UNITED STATES PATENT AND TRADEMARK OFFICE
CERTIFICATE OF CORRECTION

PATENT NO.    : 6,415,312 B1
DATED         : July 2, 2002
INVENTOR(S)   : Richard H. Boivie It is certified that error appears in the above-identified patent and that said Letters Patent is hereby corrected as shown below:

<u>Title page,</u>
Item [54], Title, please change the Title of Invention from "RELIABLE MULTICAST FOR SMALL GROUPS" to -- METHOD AND APPARATUS FOR RELIABLE MULTICAST OF DATA TO MULTIPLE DESTINATIONS --

Signed and Sealed this

Tenth Day of December, 2002

JAMES E. ROGAN
*Director of the United States Patent and Trademark Office*